US006979944B2

(12) United States Patent
Ryu et al.

(10) Patent No.: US 6,979,944 B2
(45) Date of Patent: Dec. 27, 2005

(54) DISPLAY DEVICE SHARED BETWEEN DIGITAL-TO-ANALOG CONVERTER FOR OUTPUTTING CONVERGENCE SIGNAL AND DYNAMIC FOCUS SIGNAL

(75) Inventors: Il-hyeon Ryu, Gyeonggi-do (KR); Jae-seung Shim, Seoul (KR)

(73) Assignee: Samsung Electronics Co., Ltd., (KR)

( * ) Notice: Subject to any disclaimer, the term of this patent is extended or adjusted under 35 U.S.C. 154(b) by 26 days.

(21) Appl. No.: 10/865,931

(22) Filed: Jun. 14, 2004

(65) Prior Publication Data
US 2004/0251857 A1 Dec. 16, 2004

(30) Foreign Application Priority Data
Jun. 14, 2003 (KR) ...................... 10-2003-0038517

(51) Int. Cl.[7] ............................................. H01J 29/70
(52) U.S. Cl. .................. 313/412; 315/368.24; 348/806
(58) Field of Search ...................... 345/7–10; 348/189, 348/190, 806, 180; 313/412–415; 315/364, 315/366, 386, 370, 368.24, 382, 411

(56) References Cited

U.S. PATENT DOCUMENTS

| | | | | |
|---|---|---|---|---|
| 4,514,756 A | * | 4/1985 | Blank et al. ................. | 348/810 |
| 5,016,095 A | * | 5/1991 | Kii .............................. | 348/806 |
| 5,570,691 A | * | 11/1996 | Wright et al. ................ | 600/447 |
| 5,610,475 A | * | 3/1997 | Chen ........................... | 313/414 |
| 6,407,724 B2 | * | 6/2002 | Waldern et al. ................. | 345/8 |

FOREIGN PATENT DOCUMENTS

| | | |
|---|---|---|
| JP | 8-163578 A | 6/1996 |
| JP | 10-66098 A | 3/1998 |
| KR | 2002-0049874 A | 6/2002 |

* cited by examiner

Primary Examiner—Wilson Lee
(74) Attorney, Agent, or Firm—Sughrue Mion, PLLC

(57) ABSTRACT

Provided are a display device, and more particularly, a display device shared between a digital-to-analog converter for outputting a convergence signal and a digital-to-analog converter for outputting a dynamic focus signal, in a projection television using 3 cathode-ray tube projection optics. The display device includes a convergence and dynamic focus corrector and operation processor which corrects a convergence to adjust red and blue color images to a green color image using horizontal and vertical sync signals and controls a focus to converge focuses of portions of an image displayed on central and peripheral portions of a screen using the horizontal and vertical sync signals; a first digital-to-analog converter which converts corrected horizontal red, green, and blue signals and a dynamic focus control signal sequentially output from the convergence and dynamic focus corrector and operation processor into analog signals; a second digital-to-analog converter which converts corrected vertical red, green, and blue signals sequentially output from the convergence and dynamic focus corrector and operation processor into analog signals; and a multiplexer which selectively switches and outputs the analog signals output from the first and second digital-to-analog converters in response to a selection control signal output from the convergence and dynamic focus corrector and operation processor.

10 Claims, 7 Drawing Sheets

DISPLAY DEVICE SHARED BETWEEN DIGITAL-TO-ANALOG CONVERTER FOR OUTPUTTING CONVERGENCE SIGNAL AND DYNAMIC FOCUS SIGNAL

BACKGROUND OF THE INVENTION

This application claims the priority of Korean Patent Application No. 2003-38517, filed on Jun. 14, 2003, in the Korean Intellectual Property Office, the disclosure of which is incorporated herein in its entirety by reference.

1. Field of the Invention

Apparatuses and methods consistent with the present invention relate to a display device, and more particularly to a display device shared between a digital-to-analog converter for outputting a convergence signal and a digital-to-analog converter for outputting a dynamic focus signal, in a projection television using 3 cathode-ray tube projection optics.

2. Description of the Related Art

A projection television includes cathode ray tubes (CRTs) which display red (R), green (G), and blue (B) color images and projects the R, G, and B color images on a screen, respectively.

As shown in FIG. 1A, R, G, and B color images R 100a, G 101a, and B 102a are projected in a biased state on a screen. Thus, a convergence correction is quite important to adjust the display of the R, G, and B color images 100a, 101a, and 102a on the screen so that an image 103a is formed.

FIG. 1B is a block diagram of a conventional convergence correction device. Referring to FIG. 1B, a convergence corrector and operation processor 100b adjusts a convergence using input horizontal and vertical sync signals. The convergence corrector and operation processor 100b performs convergence correction and operation to adjust R and B images to a G image.

The convergence corrector and operation processor 100b outputs corrected horizontal and vertical R, G, and B signals. A digital-to-analog converter (DAC) 101b, having first through sixth DACs, converts the corrected horizontal and vertical R, G, and B signals into analog convergence correction signals, respectively.

A low pass filter (LPF) 102b, having first through sixth LPFs, low-pass filters the analog convergence correction signals, respectively.

An amplifier 103b, having first through sixth amplifiers, amplifies the analog convergence correction signals, respectively. The amplified analog convergence correction signals are output to a screen (not shown).

As shown in FIG. 1C, in the projection television, R, G, and B CRTs 100c, 101c, and 102c project R, G, and B image signals, respectively. Lenses 103c, 104c, and 105c magnify the R, G, and B image signals, respectively. The magnified R, G, and B image signals are projected and displayed as one image on a screen 106c. However, the image is not clear due to different focuses on the central and peripheral portions of the screen 106c. A focus controller is needed to correct this.

FIG. 1D is a block diagram of a conventional dynamic focus controller. Referring to FIG. 1D, a dynamic focus operation processor 100d performs a dynamic focus control using input horizontal and vertical sync signals. The dynamic focus operation processor 100d performs an operation to transmit peripheral CRT beams to a screen (not shown) faster than a central CRT beam so as to output a dynamic focus control signal.

A DAC 101d converts the dynamic focus control signal into an analog dynamic focus control signal.

An LPF 102d low-pass filters the analog dynamic focus control signal.

An AMP 103d amplifies the analog dynamic focus control signal and outputs a final dynamic focus control signal, i.e., a parabolic wave.

FIG. 2A is a block diagram of another example of a conventional convergence correction device. Referring to FIG. 2A, a convergence corrector and operation processor 200a adjusts a convergence using input horizontal and vertical sync signals. The convergence corrector and operation processor 200a performs convergence correction and operation to adjust R and B color images to a G color image.

The convergence corrector and operation processor 200a outputs corrected horizontal and vertical R, G, and B signals. A first DAC 201a converts the horizontal R, G, and B signals into analog R, G, and B signals.

A second DAC 202a converts the vertical R, G, and B signals into analog R, G, and B signals.

A multiplexer (MUX) 203a selects the first DAC 201a or the second DAC 202a in response to a selection control signal output from the convergence corrector and operation processor 200a to output a horizontal R signal, a vertical R signal, a horizontal G signal, a vertical G signal, a horizontal B signal, and a vertical B signal.

An LPF 204a, having first through sixth LPFs, low-pass filters the horizontal R signal, the vertical R signal, the horizontal G signal, the vertical G signal, the horizontal B signal, and the vertical B signal, respectively.

An AMP 205a, having first through sixth AMPs, amplifies the horizontal R signal, the vertical R signal, the horizontal G signal, the vertical G signal, the horizontal B signal, and the vertical B signal, respectively, and outputs them to a screen (not shown).

FIG. 2B is a block diagram of another example of a conventional dynamic focus controller. The conventional dynamic focus controller of FIG. 2B is the same as that of FIG. 1D and thus will not be described herein.

U.S. Pat. No. 5,614,792 discloses such convergence correction and dynamic focus control.

As described with reference to FIGS. 1A through 1D, 2A, and 2B, the conventional convergence correction device and dynamic focus controller are separately installed and operated in the projection television. Thus, a plurality of DACs are needed to convert convergence correction signals and a dynamic focus control signal into analog convergence correction signals and an analog dynamic focus control signal. Accordingly, since a large number of components are necessary, the configuration of hardware is complicated, which increases the material cost.

SUMMARY OF THE INVENTION

Illustrative, non-limiting embodiments of the present invention overcome the above disadvantages and other disadvantages not described above. Also, the present invention is not required to overcome the disadvantages described above, and illustrative, non-limiting embodiment of the present invention may not overcome any of the problems described above. The present invention provides a display device shared between a DAC for outputting a convergence signal and a DAC for outputting a dynamic focus signal to reduce the number of components and simplify the configuration of hardware, in a projection television, so as to cut down the material cost.

According to an aspect of the present invention, there is provided a display device, the display device comprising a convergence and dynamic focus corrector and operation processor which corrects a convergence to adjust red and blue color images to a green color image using horizontal and vertical sync signals and controls a focus to converge focuses of portions of an image displayed on central and peripheral portions of a screen using the horizontal and vertical sync signals; a first digital-to-analog converter which converts corrected horizontal red, green, and blue signals and a dynamic focus control signal sequentially output from the convergence and dynamic focus corrector and operation processor into analog signals; a second digital-to-analog converter which converts corrected vertical red, green, and blue signals sequentially output from the convergence and dynamic focus corrector and operation processor into analog signals; and a multiplexer which selectively switches and outputs the analog signals output from the first and second digital-to-analog converters in response to a selection control signal output from the convergence and dynamic focus corrector and operation processor.

The convergence and dynamic focus corrector and operation processor outputs the dynamic focus control signal to the first or second digital-to-analog converter.

The display device further comprises a low-pass filter and an amplifier which low-pass filters and amplifies the analog signals output from the multiplexer and then outputs the analog signals to the screen.

The first and second digital-to-analog converters form a single body depending on sampling rates of the first and second digital-to-analog converters and a switching speed of the multiplexer.

According to another aspect of the present invention, there is provided a display device, the display device comprising a convergence and dynamic focus corrector and operation processor which corrects a convergence to adjust red and blue color images to a green color image using horizontal and vertical sync signals and controls a focus to converge focuses of portions of an image displayed on central and peripheral portions of a screen using the horizontal and vertical sync signals; a digital-to-analog converter which converts a horizontal red signal, a vertical red signal, a horizontal green signal, a vertical green signal, a horizontal blue signal, a vertical blue signal, and a dynamic focus control signal sequentially output from the convergence and dynamic focus corrector and operation processor into analog signals; and a multiplexer which selectively switches and outputs the analog signals output from the digital-to-analog converter in response to a selection control signal output from the convergence and dynamic focus corrector and operation processor.

The display device further comprises a low-pass filter and an amplifier which low-pass filters and amplifies the analog signals output from the multiplexer and then outputs the analog signal to the screen.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail with reference to the attached drawings.

Figure 1A:
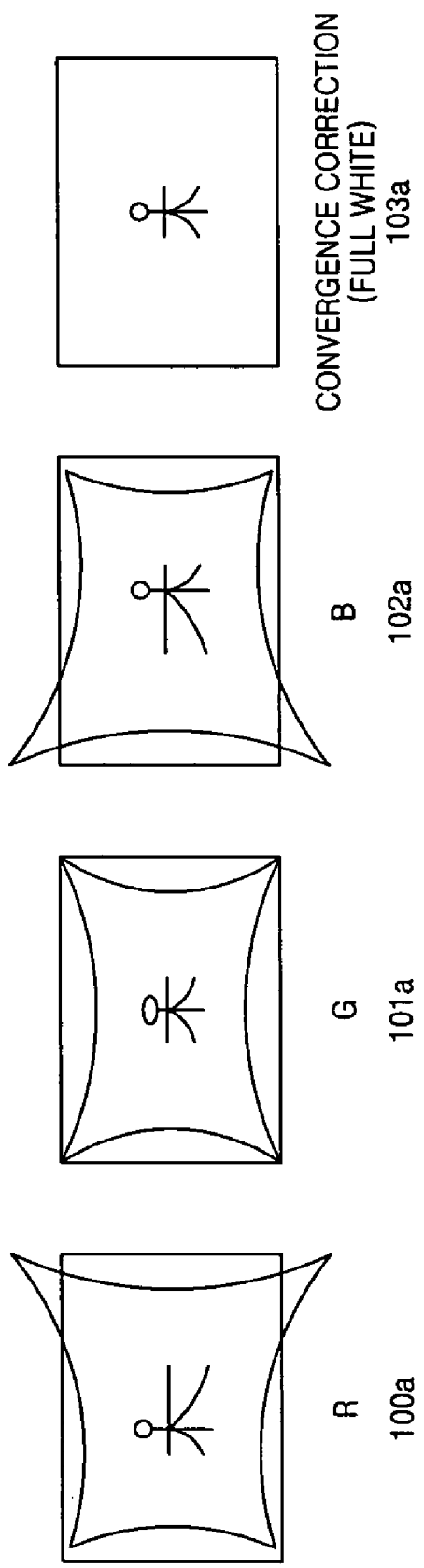
FIGS. 1A and 1B are a schematic view and a block diagram for explaining a conventional convergence correction device.
Figure 1B:
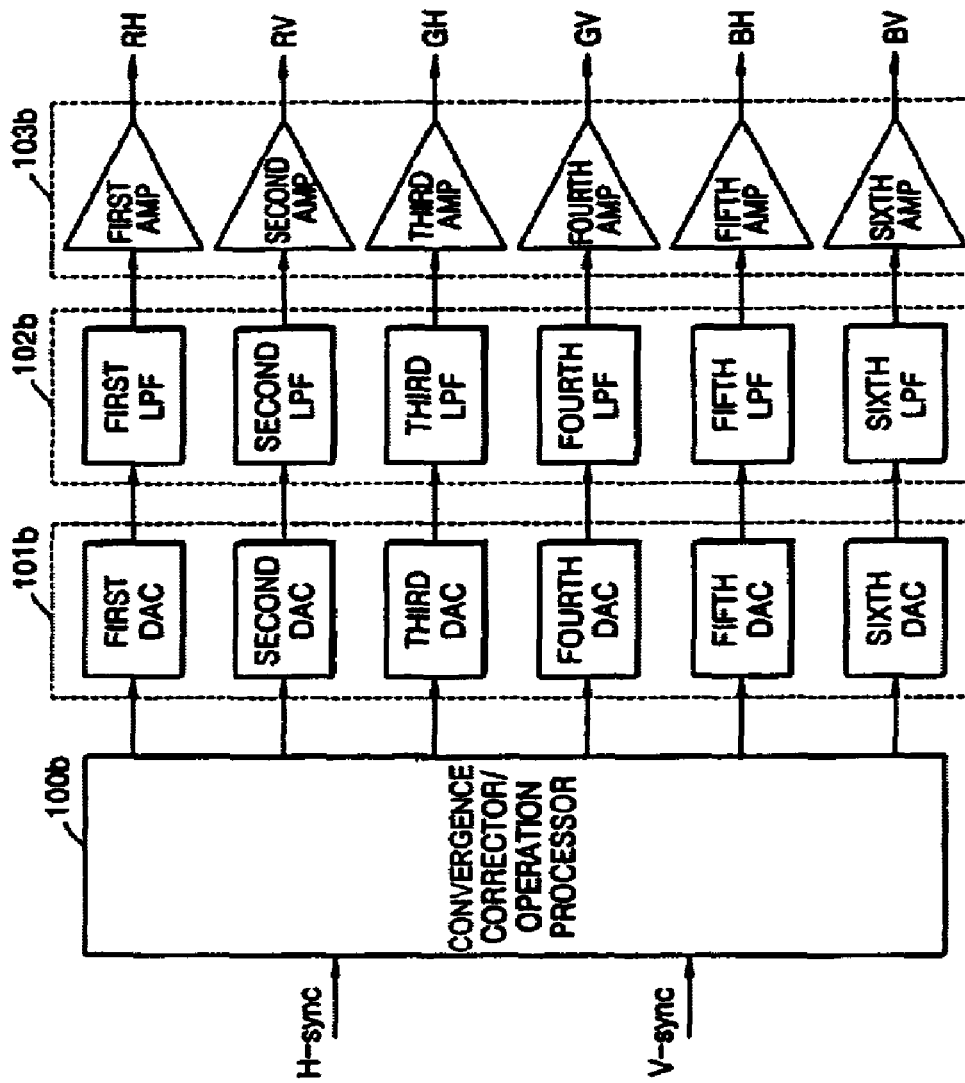
Figure 1C:
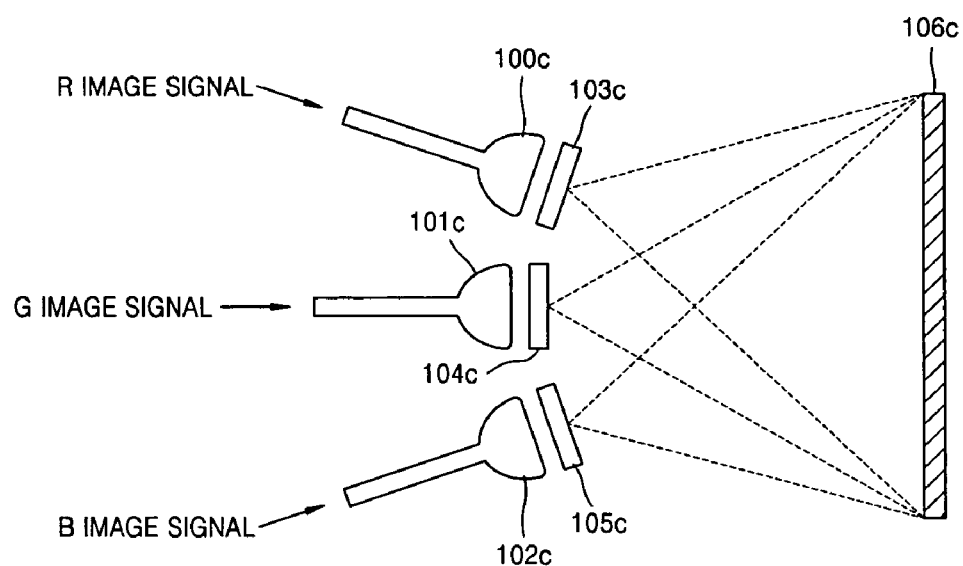
FIGS. 1C and 1D are a schematic view and a block diagram for explaining a conventional dynamic focus controller.
Figure 1D:
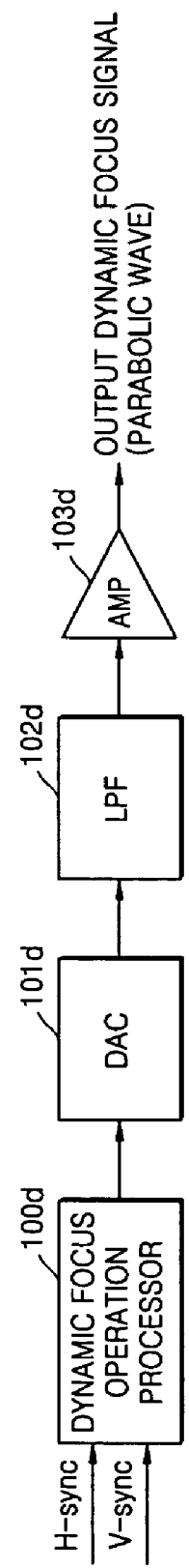
Figure 2A:
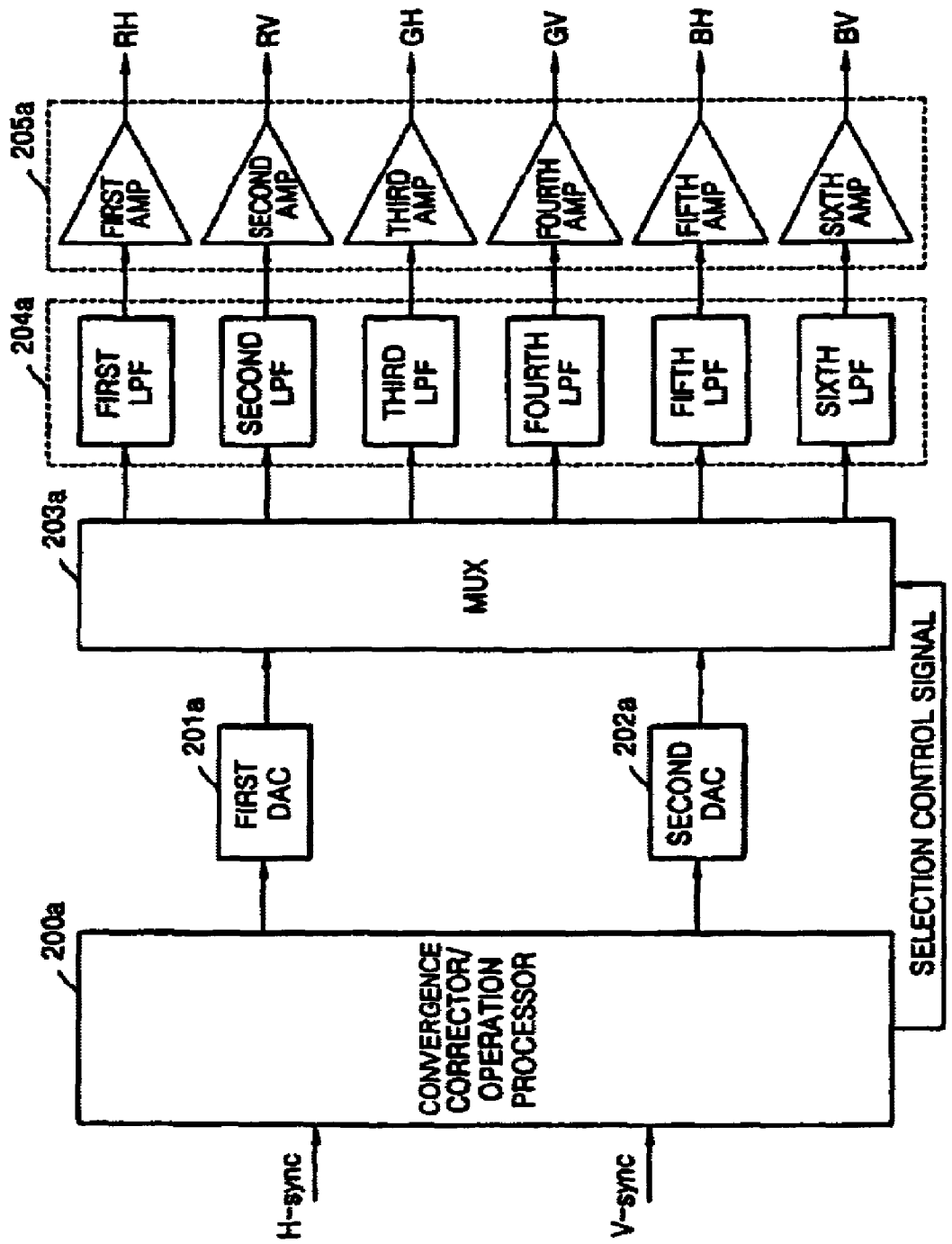
FIGS. 2A and 2B are block diagrams of respective examples of a conventional convergence correction device and a conventional dynamic focus controller.
Figure 2B:
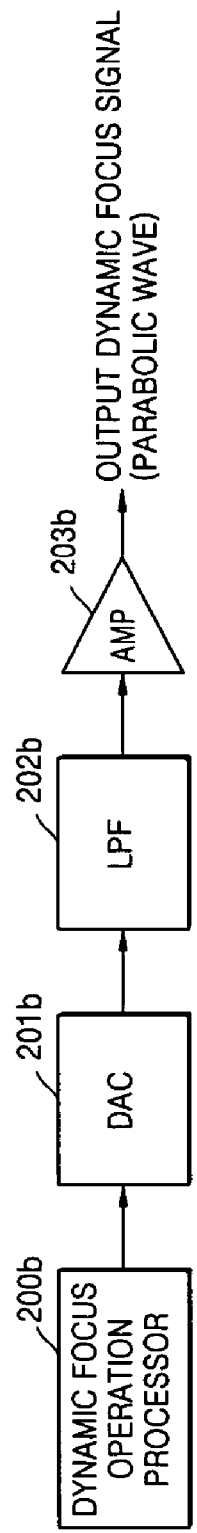
Figure 3:
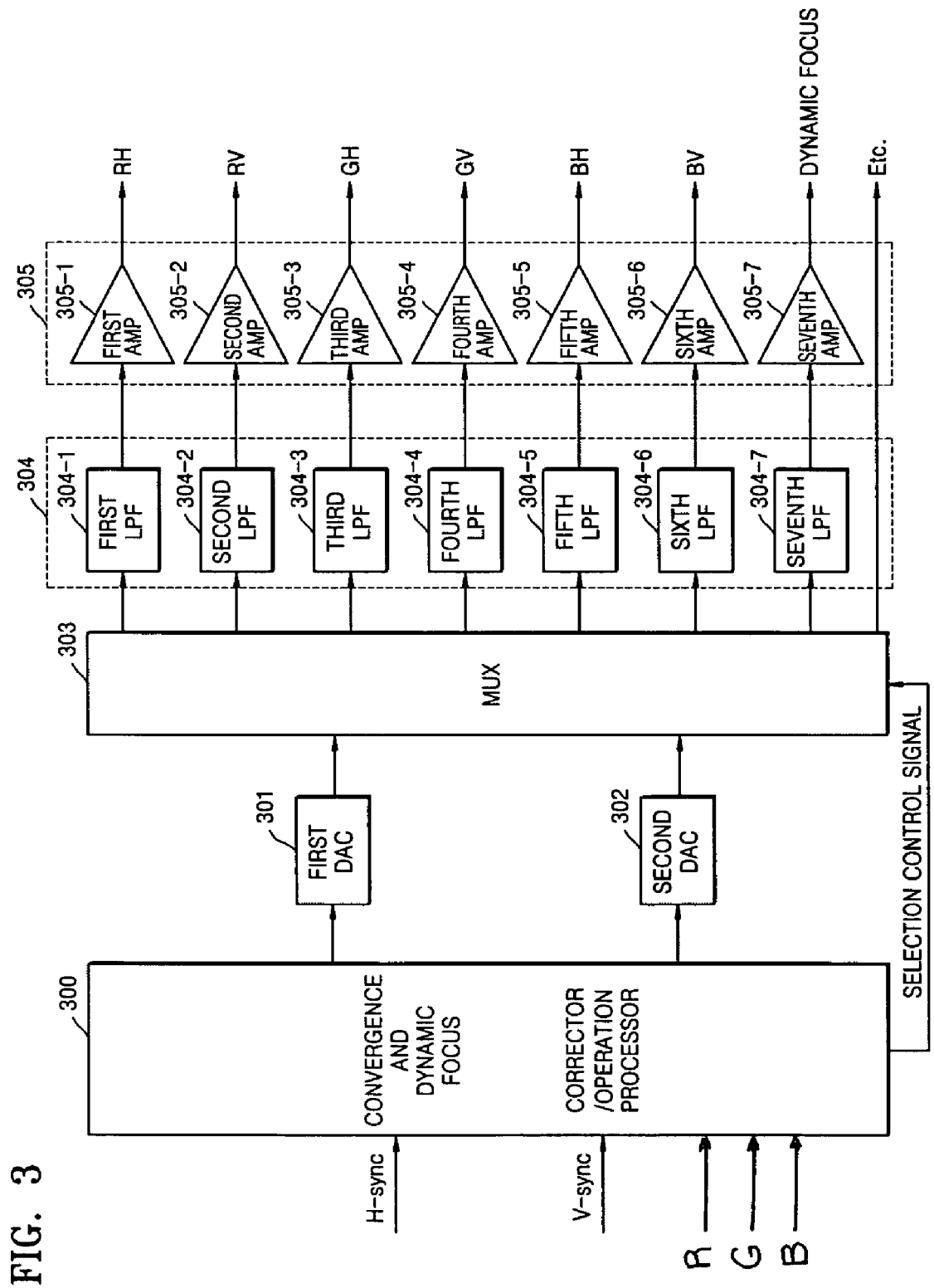
FIG. 3 is a block diagram of a display device shared between a DAC for outputting a convergence signal and a DAC for outputting a dynamic focus signal, according to the present invention.

FIG. 3 is a block diagram of a display device shared between a DAC for outputting a convergence signal and a DAC for outputting a dynamic focus signal, according to the present invention. Referring to FIG. 3, the display device includes a convergence and dynamic focus corrector and operation processor 300, a first DAC 301, a second DAC 302, a MUX 303, an LPF 304, and an AMP 305. In the present invention, the first and second DACs 301 and 302 may form a single body.

The convergence and dynamic focus corrector and operation processor 300 corrects a convergence and controls a focus using input horizontal and vertical sync signals and outputs an extra signal Etc.

The convergence and dynamic focus corrector and operation processor 300 performs a convergence correction/operation process to adjust R and B color images to a R color image to converge biased R, G, and B color images on a screen (not shown) of a projection television, to thereby output a convergence correction signal.

The convergence and dynamic focus corrector and operation processor 300 performs a dynamic focus control/operation process to control velocities of CRT beams projected on the central and peripheral portions of the screen, so as to converge focuses of portions of an image displayed on the central and peripheral portions of the screen. Next, the convergence and dynamic focus corrector and operation processor 300 outputs a dynamic focus control signal.

In the prior art, the convergence correction/operation and the dynamic focus control/operation are separately performed. In contrast, in the present invention, the convergence and dynamic focus corrector/operation processor performs both the convergence correction/operation and the dynamic focus control/operation. These functions may performed by a single component.

The first DAC 301 converts corrected horizontal R, G, and B signals and the dynamic focus control signal, which are sequentially output from the convergence and dynamic focus corrector and operation processor 300, into analog horizontal R, G, and B signals and an analog dynamic focus control signal.

The second DAC 302 converts corrected vertical R, G, and B signals, which are sequentially output from convergence and dynamic focus corrector and operation processor 300, into analog vertical R, G, and B signals.

Here, the dynamic focus control signal may be output to the first DAC 301 or the second DAC 302.

In a case where sampling rates of the first and second DACs 301 and 302 and a switching speed of the MUX 303 are suitable, the first and second DACs 301 and 302 may form a signal body. In this case, one DAC converts the convergence correction signals and the dynamic focus control signal output from the convergence and dynamic focus corrector and operation processor 300 into analog convergence correction signals and an analog dynamic focus control signal.

The MUX 303 is a switch which switches the analog signals output from the first DAC 301 or the second DAC 302 in response to a selection control signal output from the convergence and dynamic focus corrector and operation processor 300. Since the convergence and dynamic focus corrector and operation processor 300 outputs signals using a time division method, the MUX 303s can switch the analog signals output from the first DAC 301 or the second DAC 302 in response to the selection control signal.

For example, the convergence and dynamic focus corrector and operation processor 300 sequentially outputs the horizontal R signal, the vertical R signal, the horizontal G signal, the vertical G signal, the horizontal B signal, the vertical B signal, the dynamic focus control signal, and the extra signal. The first DAC 301 converts the horizontal R, G, and B signals and the dynamic focus control signal into analog signals, and the second DAC 302 converts the vertical R, G, and B signals and the extra signal into analog signals. The MUX 303 selects the first DAC 301 or the second DAC 302 in response to the selection control signal to sequentially select and output the horizontal R signal, the vertical R signal, the horizontal G signal, the vertical G signal, the horizontal B signal, the vertical B signal, the dynamic focus control signal, and the extra signal.

The horizontal R signal, the vertical R signal, the horizontal G signal, the vertical G signal, the horizontal B signal, the vertical B signal, the dynamic focus control signal, and the extra signal pass through the LPF 304 and the AMP 305 and are finally output to the screen.

First through seventh LPFs 304-1 through 304-7 of the LPF 304 low-pass filter the horizontal R signal, the vertical R signal, the horizontal G signal, the vertical G signal, the horizontal B signal, the vertical B signal, and the dynamic focus control signal.

First through seventh AMPs 305-1 through 305-7 of the AMP 305 amplify the horizontal R signal, the vertical R signal, the horizontal G signal, the vertical G signal, the horizontal B signal, the vertical B signal, and the dynamic focus control signal and then output the amplified signals to the screen.

As described above, a display device according to the present can have a DAC which both outputs a convergence signal and outputs a dynamic focus signal in a projection television using 3 cathode-ray tube projection optics. As a result, since the number of components can be reduced, the configuration of hardware can be simplified, which results in a reduction in the material cost. Also, when sampling rates of the DACs and a switching speed of a MUX are suitable, a convergence signal, a dynamic focus wave, and an extra analog signal can be output using only one DAC.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising:
   a convergence and dynamic focus corrector and operation processor which corrects a convergence to adjust a first color image and a second color image to an image of a third color using horizontal and vertical sync signals and controls a focus to converge focuses of portions of a displayed image displayed on central and peripheral portions of a screen using the horizontal and vertical sync signals;
   a first digital-to-analog converter which converts corrected horizontal signals of the first color, the second color and the third color and a dynamic focus control signal sequentially output from the convergence and dynamic focus corrector and operation processor into analog signals;
   a second digital-to-analog converter which converts corrected vertical signals of the first color, the second color and the third color sequentially output from the convergence and dynamic focus corrector and operation processor into analog signals; and
   a multiplexer which selectively switches and outputs the analog signals output from the first and second digital-to-analog converters in response to a selection control signal output from the convergence and dynamic focus corrector and operation processor.

2. The display device of claim 1, wherein the convergence and dynamic focus corrector and operation processor outputs the dynamic focus control signal to the first or second digital-to-analog converter.

3. The display device of claim 1, further comprising a low-pass filter and amplifier which low-pass filters and amplifies the analog signals output from the multiplexer and then outputs the low-pass filtered and amplified analog signals to the screen.

4. The display device of claim 1, wherein the first and second digital-to-analog converters form a single body.

5. The display device of claim 1, wherein the first color is red, the second color is blue and the third color is green.

6. A display device comprising:
   a convergence and dynamic focus corrector and operation processor which corrects a convergence to adjust a first color image and a second color image to a third color image using horizontal and vertical sync signals and controls a focus to converge focuses of portions of an image displayed on central and peripheral portions of a screen using the horizontal and vertical sync signals;
   a digital-to-analog converter which converts a horizontal signal of the first color, a vertical signal of the first color, a horizontal signal of the third color, a vertical signal of the third color, a horizontal signal of the second color, a vertical signal of the second color, and a dynamic focus control signal sequentially output from the convergence and dynamic focus corrector and operation processor into analog signals; and
   a multiplexer which selectively switches and outputs the analog signals output from the digital-to-analog converter in response to a selection control signal output from the convergence and dynamic focus corrector and operation processor.

7. The display device of claim 6, further comprising a low-pass filter and an amplifier which low-pass filters and amplifies the analog signals output from the multiplexer and then outputs the low-pass filtered and amplified analog signals to the screen.

8. The display device of claim 6, wherein the first color is red, the second color is blue and the third color is green.

9. A display device comprising:
   a convergence corrector that corrects a convergence to adjust an image of a first color and an image of a second color to an image of a third color using horizontal and vertical sync signals;

a dynamic focus controller that controls a focus to converge focuses of portions of an image displayed on central and peripheral portions of a screen using the horizontal and vertical sync signals;

a digital-to-analog converter that converts corrected horizontal signals of the first, second and third colors and vertical signals of the first, second and third colors and a dynamic focus control signal sequentially output from the convergence and dynamic focus corrector and operation processor into analog signals; and a multiplexer that selectively switches and outputs the analog signals output from the digital-to-analog converters, wherein, the convergence corrector and the dynamic focus controller are a single component.

10. The display device of claim 9, wherein the first color is red, the second color is blue and the third color is green.

* * * * *